(12) United States Patent
Sekino et al.

(10) Patent No.: US 9,771,034 B2
(45) Date of Patent: Sep. 26, 2017

(54) POWER SUPPLY DEVICE

(71) Applicant: Yazaki Corporation, Tokyo (JP)

(72) Inventors: Tsukasa Sekino, Makinohara (JP);
Hiroshi Yamashita, Makinohara (JP);
Daisuke Okamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 72 days.

(21) Appl. No.: 14/917,170

(22) PCT Filed: Oct. 7, 2014

(86) PCT No.: PCT/JP2014/076804
§ 371 (c)(1),
(2) Date: Mar. 7, 2016

(87) PCT Pub. No.: WO2015/053264
PCT Pub. Date: Apr. 16, 2015

(65) Prior Publication Data
US 2016/0207480 A1      Jul. 21, 2016

(30) Foreign Application Priority Data
Oct. 11, 2013   (JP) ................................ 2013-214080

(51) Int. Cl.
*B60L 1/00* (2006.01)
*B60R 16/02* (2006.01)
(Continued)

(52) U.S. Cl.
CPC ........ *B60R 16/0207* (2013.01); *B60R 16/027* (2013.01); *B60R 16/03* (2013.01);
(Continued)

(58) Field of Classification Search
CPC ... B60R 16/0207; B60R 16/027; B60R 16/03; H02G 11/006; H02G 3/0468; H02G 3/0691
See application file for complete search history.

(56) References Cited

U.S. PATENT DOCUMENTS

| 2007/0084619 A1 | 4/2007 | Kisu et al. |
| 2009/0121093 A1 | 5/2009 | Murayama et al. |
| 2009/0140107 A1 | 6/2009 | Murayama et al. |

FOREIGN PATENT DOCUMENTS

JP      2007-151377 A      6/2007

OTHER PUBLICATIONS

International Search Report dated Dec. 22, 2014, issued for PCT/JP2014/076804.

*Primary Examiner* — Daniel Cavallari
(74) *Attorney, Agent, or Firm* — Locke Lord LLP (57) ABSTRACT

A power supply device includes a rotation retainer including an inlet horizontally guiding the electrical wire one end of which is connected to the vehicle, and an outlet communicating with the inlet and to draw out upwardly the other end of the electrical wire, the rotation retainer being arranged horizontally pivotally in the slide door to retain the electrical wire movably, a biasing member configured to bias the rotation retainer in a predetermined rotational direction, wherein the electrical wire includes a bending portion to be bent in an L-shape between the inlet and the outlet, and a guide portion to be wired nearer the outlet than the bending portion, and wherein the guide portion is arranged in a natural state in which the guide portion is not twisted, or a twisted state in which restoring force is generated in a same direction as a biasing direction of the biasing member.

2 Claims, 6 Drawing Sheets

(51) Int. Cl.
  *H02G 11/00* (2006.01)
  *B60R 16/027* (2006.01)
  *B60R 16/03* (2006.01)
  *H02G 3/04* (2006.01)
  *H02G 3/06* (2006.01)
(52) U.S. Cl.
  CPC ......... *H02G 11/006* (2013.01); *H02G 3/0468* (2013.01); *H02G 3/0691* (2013.01)

POWER SUPPLY DEVICE

TECHNICAL FIELD

The present invention relates to a power supply device that is mounted on a slide door for example and freely oscillatorily retains a wire harness.

BACKGROUND ART

Conventionally, in order to supply power at all times to a slide door of an automobile, various types of power supply devices have been advocated, and a power supply device is known that horizontally rotates a wire harness for supplying power with a freely oscillatory member, following opening and closing of the slide door.

For example, PTL 1 discloses (not shown) a power supply device at a slide door that includes an upper wall and a lower wall provided in a horizontal direction, a fixing portion formed into a cross-sectional U-shape with the upper wall and a rear wall perpendicular to the lower wall, and fixed to the slide door, and a freely oscillatory member horizontally pivotally retained between the upper wall and the lower wall of the fixing portion, in which the wire harness is bent and inserted into the fixing portion and the freely oscillatory member, so as to be wired to a vehicle body.

A power supply device (hereinafter referred to as "a power supply device with a spring") is advocated by the inventor in JPA 2013-009138 as such a type of power supply device that the freely oscillatory member of power supply device described in PTL 1 is biased using a spring so as to apply a biasing force of the spring to the wired electrical wire, which can thus be bent in substantially S-shape without inducing buckling.

CITATION LIST

Patent Literature

[PTL 1]
Japanese Patent Laid-Open No.2007-151377

SUMMARY OF INVENTION

Technical Problem

There has been a desire to downsize the abovementioned power supply device with a spring.

The object of the present invention is to provide a power supply device that bends an electrical wire into a predetermined shape by applying an adequate biasing force thereto and can be downsized.

Solution to Problem

A present invention according to a first aspect is a power supply device supplying power by wiring an electrical wire to a slide door slidable between a closed position where an opening of a vehicle is fully closed and an opening position where the opening of the vehicle is fully opened, the power supply device including: a rotation retainer including an inlet horizontally guiding the electrical wire one end of which is connected to the vehicle, and an outlet configured to communicate with the inlet and to draw out upwardly the other end of the electrical wire, the rotation retainer arranged horizontally pivotally in the slide door to movably retain the electrical wire; a biasing member configured to bias the rotation retainer in a predetermined rotational direction, the electrical wire including a bending portion to be bent into an L-shape between the inlet and the outlet, and a guide portion to be wired nearer the outlet than the bending portion, wherein the guide portion, with the slide door arranged in the closed position, is arranged in a natural state in which the guide portion is not twisted, or a twisted state in which a restoring force is generated in a same direction as a biasing direction of the biasing member.

A present invention according to a second aspect is the power supply device according to the first aspect further including an electrical wire fixing portion configured to fix the guide portion of the electrical wire at a side separated from the bending portion.

Advantageous Effects of Invention

According to the present invention of the first aspect the electrical wire includes the bending portion bent in L-shape between the inlet and the outlet, and the guide portion wired nearer the outlet than the bending portion, the guide portion is, with the slide door being arranged in the closed position, arranged in the natural state in which the guide portion is not twisted, or the twisted state in which the restoring force is generated in the same direction as the biasing direction of the biasing member. Thus as the slide door moves from the closed position to the opening position, the guide portion of the electrical wire is further twisted, and thereby the guide portion of the electrical wire, with the slide door being arranged in the opening position, has the restoring force generated in the same direction as the biasing direction of the biasing member. Therefore, in a condition where the slide door is arranged in the opening position, both the biasing force of the biasing member and the twist restoring force of the guide portion of the electrical wire are facilitated, biasing the rotation retainer. It is thus possible to increase the biasing force to the rotation retainer without enlarging the biasing member. Therefore, as the biasing member can be used of which biasing force is small, it is possible to provide the power supply device capable of downsizing.

According to the present invention of the second aspect, the electrical wire fixing portion is also provided for fixing the guide portion of the electrical wire at the side separated from the bending portion, making it possible to retain the guide portion of the electrical wire in the predetermined state (the natural state in which the guide portion is not twisted, or the twisted state in which the restoring force is generated in the same direction as the biasing direction of the biasing member). Herein, strength of the restring force generated in the electrical wire by twisting the electrical wire is determined by a length from the bending portion of the electrical wire to a position where the electrical wire is fixed by the electrical wire fixing portion. Supposed that a position of the electrical wire fixing portion makes short the length from the bending portion of the electrical wire to the position where the electrical wire is fixed by the electrical wire fixing portion, the electrical wire becomes twisted such that the restoring force to be generated in the electrical wire further increases, and the larger the length from the bending portion of the electrical wire to the position where the electrical wire is fixed by the electrical wire fixing portion, the further twisted the electrical wire such that the restoring force to be generated in the electrical wire further decreases.

Namely, the position of the electrical wire fixing portion is determined by the strength of the restoring force required for the electrical wire.

DESCRIPTION OF EMBODIMENT

Hereinafter with reference to FIGS. 1 to 5 will be described one embodiment of a power supply device of the invention.

Figure 1:
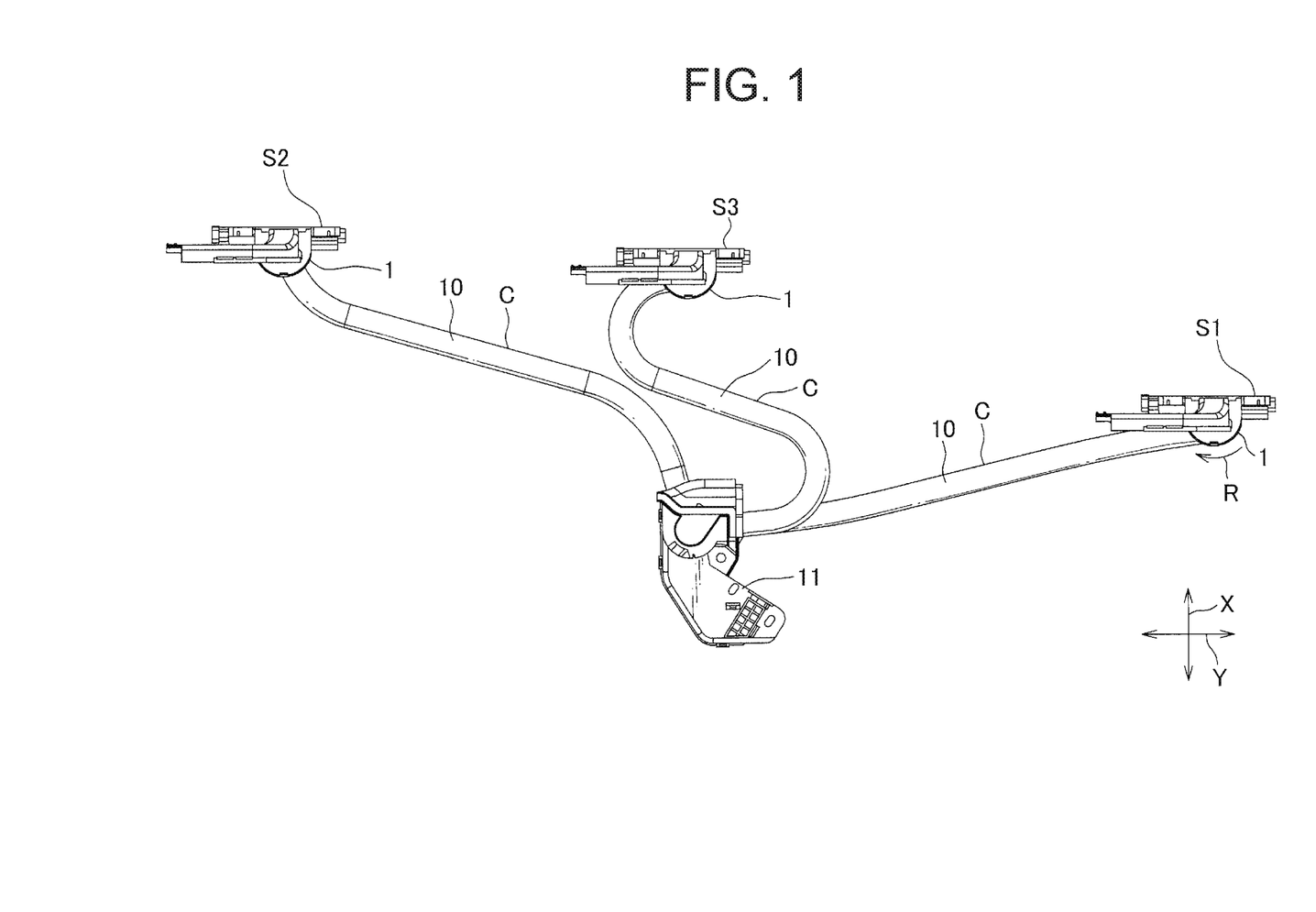
FIG. 1 is a plane view illustrating a motion of the electrical wire retained by a power supply device of one embodiment of the invention every opening state and closing state of a slide door.

As shown in FIG. 1, a power supply device 1 is a device to supply power by wiring an electrical wire 10 to a slide door (not shown) slidable between a closed position S1 in which an opening of a vehicle door (not shown) is fully closed and an opening position S2 in which the opening of the vehicle is fully opened. This power supply device 1, as shown in FIGS. 2 and 3, in order to smoothly bend in generally S-shape without inducing buckling, biases the electrical wire using both a biasing force of a twisted coil spring 5 and a twisted restoring force of a guide portion 10C of the electrical wire 10 such that an inlet 3a of a rotation member 3 (rotation retainer) retaining the electrical wire 10 is oriented toward an opening direction (a moving direction of the slide door from the closed position and the opening position) as the slide door moves from the closed position Si to the opening position S2.

FIG. 1 illustrates a state in which the power supply device 1 is mounted in the slide door, and an electrical wire 10 with a corrugated tube inserted from the power supply device 1 to a corrugated tube C (an exterior member) is horizontally wired to a freely oscillatory member 11 of the vehicle body, and a figure on the right side (a front side in a travelling direction of the vehicle) in FIG. 1 illustrates a state in which the slide door is positioned in the closed position S1, a figure on the left side (a rear side in the travelling direction of the vehicle) in FIG. 1 a state in which the slide door is positioned in the opening position S2, a figure in the middle a state in which the slide door is positioned in a half opening position S3. In FIG. 1 the states of the closed position S1, the opening position S2, and the half opening position S3 of the slide door are shown by solid line, respectively.

Figure 2:
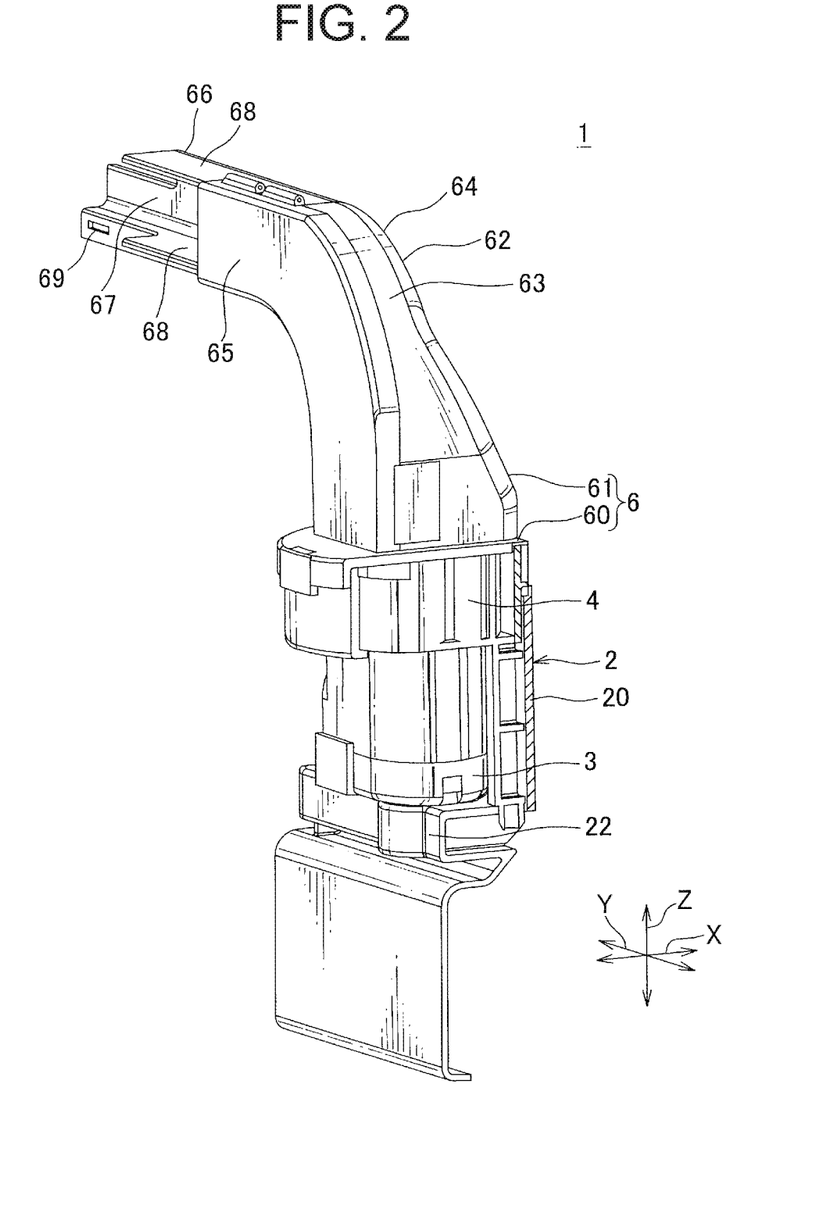
FIG. 2 is a perspective view illustrating a partial cross-sectional view of the power supply device illustrated in FIG. 1.

Here, a sliding direction (the travelling direction of the vehicle) of the slide door is shown by an arrow Y, an opposite direction perpendicular to this Y direction, an opposite direction of the slide door and vehicle body when the slide door is arranged in the opening position S2, namely a vehicle width direction is shown by an arrow Y, and a height direction (perpendicular to the paper of FIG. 1) is shown by an arrow Z (shown in FIG. 2). The X and Y directions in the specification direct horizontal direction.

Figure 3:
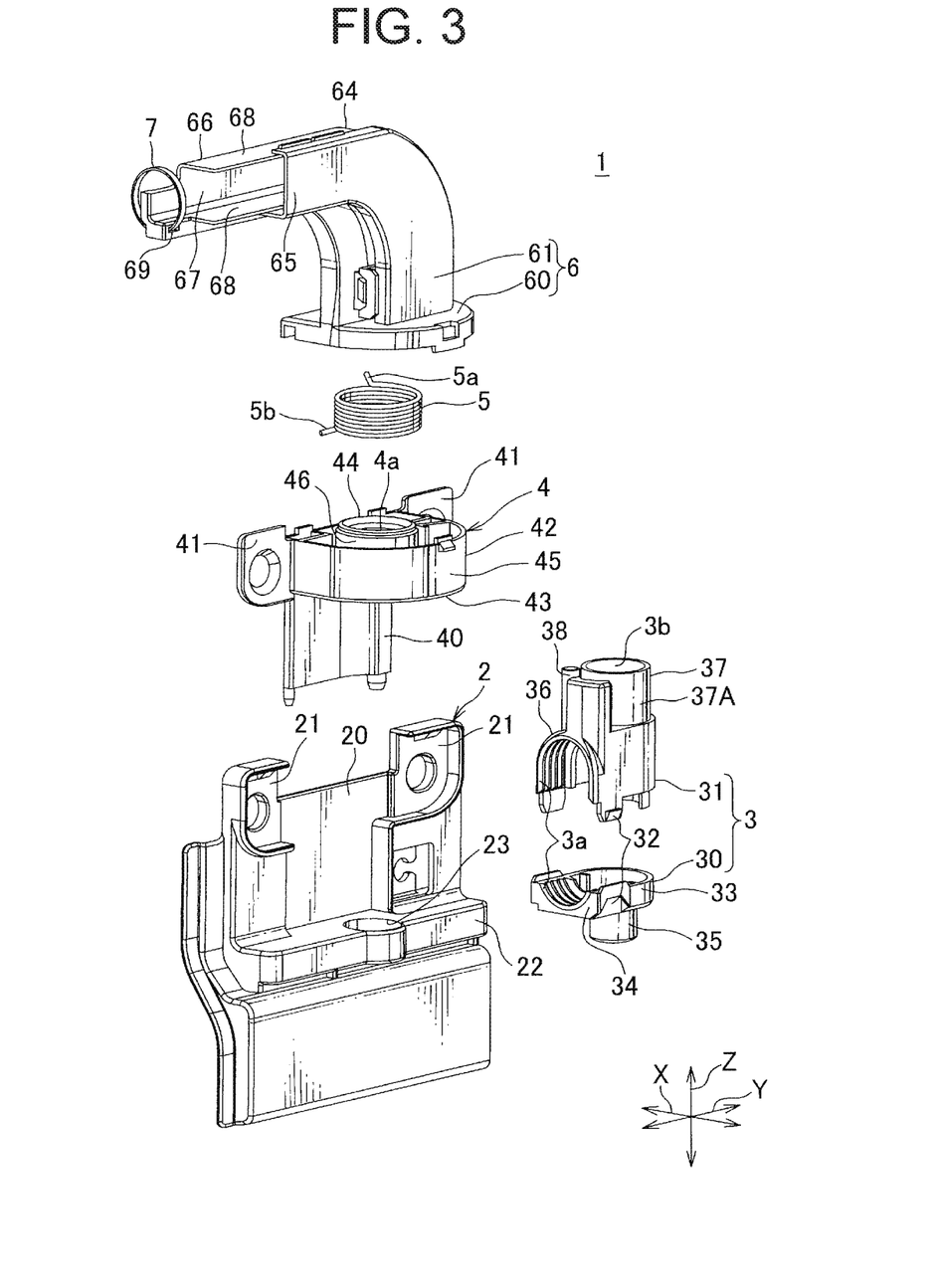
FIG. 3 is an exploded perspective view of the power supply device illustrated in FIG. 1.

The power supply device 1, as shown in FIGS. 2 and 3, includes a base 2 to be fixed to the slide door, a rotation member 3 (rotation retainer) horizontally pivotally disposed to retain movably the electrical wire 10, a support member 4 to be fixed to the base 2 so as to pivotally support the rotation member 3, a twisted coil spring 5 (biasing member) attached to the support member 4 so as to bias in the clockwise direction viewed from the top (an arrow R direction in FIG. 1), such that the inlet 3 of the rotation member 3 is oriented in the opening direction, and an electrical wire guiding part 6 fixed to the support member 4 to lead out toward the opening direction and simultaneously fix the other end of the electrical wire 10. Herein, the twisted coil spring 5 is formed into a ring shape in a plane view, and is mounted to the support member 4 with the restoring force (biasing force) remaining around center axis thereof in the arrow R direction in FIG. 1.

The base 2, as shown in FIG. 3, is provided with a base plate 20 formed into a plate-like shape and arranged stacked on the slide door (a door panel), a pair of fastening members 21 formed extending from this base plate 20 toward the travelling direction of the vehicle (the arrow Y direction) and fastened with bolt to the slide door, and a step 22 formed projecting toward a thickness direction (the arrow X direction) of the base plate 20 at a lower end of the base plate 20. A top face of the step 22 is formed plainly, and provide on the top face is a bearing 23 that is formed concavely, and passes therethrough and thereby pivotally supports a rotation shaft 35 of the rotation member 3. The bearing 23 is formed in the middle between the pair of fastening members 21.

The rotation member 3 is, as shown in FIG. 3, configured to include an inlet 3a horizontally guiding the electrical wire 10 one end of which is connected with the vehicle body, an outlet 3b communicating with the inlet 3a and leading out upwardly the other end of the electrical wire 10, and further includes a lower division part 30 and an upper division part 31 configured to divide vertically a peripheral edge constituting the inlet 3a, a lock 32 retaining a state where the lower division part 30 and the upper division part 31 are being assembled. The rotation member 3 is arranged dividable in order to retain in good workability therein the electrical wire 10.

Herein, the electrical wire 10 retained inside the rotation member 3 is, as shown in FIG. 5, includes a bending portion 10A between the inlet 3a and the outlet 3b, a guide part 10B nearer the inlet 3a than the bending portion 10A, and a guide portion 10C nearer the outlet 3b than the guide part 10A. This guide part 10B has been inserted inside the corrugated tube C. The corrugated tube C has its end pinched by a peripheral wall (namely a space between the lower guide wall 33 and the upper guide wall 36) constituting the inlet 3a of the rotation member 3.

Provided in the lower division part 30 is, as shown in FIG. 3, a lower guide wall 33 formed into half cylindrical shape including a lower portion of the peripheral wall constituting the inlet 3a, and, a cylindrical lower outlet 34 arranged in continuity with axial one end of the lower outlet 33, and a cylindrical rotation shaft 35 formed projecting downward from the lower outlet 34 and inserted into the bearing 23 of the base 2.

The upper division part 31 is configured to include an upper guide wall 36 formed into cylindrical shape including an upper part of the peripheral wall constituting the inlet 3a and a cylindrical upper outlet 37 arranged in continuity with axial one end of the upper guide wall 36. The upper outlet 37 is configured to include an outlet 3b. This upper outlet 37 is arranged such that a part (referred to as insertion part 37A hereinafter) including the outlet 3b is inserted into a bearing hole 4a (to be mentioned later) of the support member 4.

When these upper division part 31 and lower division part 30 are assembled to each other and locked with the lock part 32, edges in a circumferential direction of the lower guide part 33 and the upper guide wall 36 are stacked with each other to form the inlet 3a, and an upper edge of the lower outlet 34 and a lower edge of the upper outlet 37 are stacked so that the shaft thereof becomes cylindrical shape extending in a vertical direction (the arrow Z direction).

Also provided on the upper guide wall 36 is a spring force receiving part 38 formed into a bar-like shape projecting upward from an outer peripheral side thereof and receiving the biasing force of the twisted coil spring 5. The spring force receiving part 38 is formed such that upper end thereof is made substantially equal to an upper end of the insertion part 37A.

The support member 4 is, as shown in FIG. 3, provided with a plate-like part 40 stacked on a surface opposite to the slide door at the base plate 20 of the base 2, a pair of stacked fastening member 41 formed extending from the plate-like part 40 in the travelling direction (the arrow Y direction) so as to be stacked on the fastening member 21 of the base 2, and a substantially cylindrical housing 42 supporting, with the inlet 3a of the rotation member 3 being biased to be oriented toward the opening position S2 of the slide door. Attached to the housing 42 is an electrical wire guide part 6 guiding the electrical wire 10 to the opening direction side.

Figure 4:
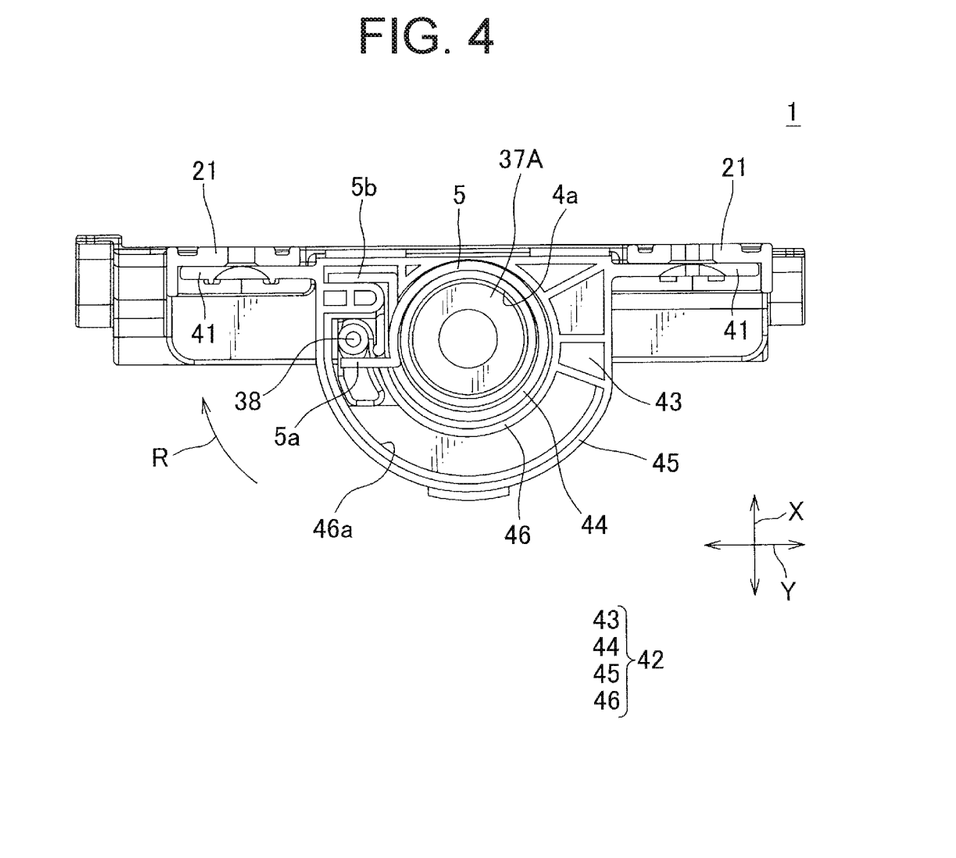
FIG. 4 is an illustrative view illustrating a state in which an inlet is biased such as to be oriented toward the opening position by a biasing member constituting the power supply device illustrated in FIG. 1.

The housing 42 is, as shown in FIG. 4, formed projecting from the upper edge of the plate-like part 40 in an opposite side to the slide door. The housing 42 is provided with a ring-like bottom plate 43 substantially in the middle thereof including a bearing hole 4a having the insertion part 37A of the rotation member 3 inserted thereinto, an inner annular part 44 formed projecting upward from an inner peripheral edge of the bottom plate 43, an outer annular part 45 formed projecting upward from an outer peripheral edge of the bottom plate 43, and a partition annular part 46 arranged between the inner annular part 44 and the outer annular part 45. Fixed to the inner annular part 44 is the other end 5b of the twisted coil spring 5 by passing the twisted coil spring 5 outside. The partition annular part 46 is formed projecting cylindrically from the bottom plate 43. A top end of the partition annular part 46 is formed lower than a position where one end 5a of the twisted coil spring 5 passed outside the inner annular part 44 is formed.

Formed in the bottom plate 43 is a rotation guide part 46 that passes the spring force receiving part 38 of the rotation member 3 through an outer circumferential side of the twisted coil spring 5 so as to move and guide the spring force receiving part 38 around the bearing hole 4a. This rotation guide part 46a is formed passing through the bottom plate 43. Also, the rotation guide part 46a is formed into an arc such that an angle crossed by one end and the other end about the bearing 4a becomes substantially equal to that allowing the rotation member 3 to rotate and move.

The housing 42 as such is configured to have the twisted coil spring 5 passed outside the inner annular part 44, have the spring force receiving part 38 of the rotation member 3 inserted into the rotation guide part 46a, and have the spring force receiving part 38 positioned nearer the arrow R direction side of the rotation guide part 46a than the one end part 5a of the twisted coil spring 5. Thus the housing 42 supports the rotation member 3, while biasing the inlet 3a to be oriented toward the opening direction side.

The electrical wire guide part 6 is, as shown in FIG. 3, provided with a plate-like covering part 60 covering the top face of the housing 42 and an electrical wire outlet 61 that is arranged upward further than the covering part 60 and leading out the other end of the electrical wire 10 in the opening direction side. The covering part 60 is provided with a spring retaining part (not shown) on a face near the housing 42 (lower side) for provisionally retaining the one end 5a of the twisted coil spring 5.

The electrical wire outlet 61 is, as shown in FIG. 2, provided with a gutter part 64 including an L plate-like base plate 62 and a pair of side plates 63 upstanding from a peripheral edge in a width direction of the base plate 62 and arranged opposite to each other, a cover 65 attached to the gutter part 64 such as to face the base plate 62 of the gutter part 64, and an extension part 66 formed extending straightly from the gutter part 64 toward the opening direction side.

The extension part 66 is provided with a continuity plate 67 continuous with the base plate 62, and a pair of continuity side plates 68 respectively continuous with the pair of side plates 63, and is formed in a gutter shape. A tip of the extension part 66 is provided with a fixing portion 69 (electrical wire fixing portion) for fixing the electrical wire 10 guided to the electrical wire guide part 6.

At the tip of the extension part 66, the pair of continuity side plates 68 and upper end of the continuity plate 67 are cut away, the fixing portion 69 is arranged at a lower end of the continuity plate 67 cut away. This fixing portion 69 is configured to include a hole passing through the continuity side plates 68 in the X direction, and for example a band part of a biding band 7 (fixing portion material) shown in FIG. 3 is passed through the hole, is wound around outside the fixing portion 69 and the electrical wire 10, is bound, and the electrical wire 10 is thus fixed. Herein, the electrical wire 10, as mentioned later, is arranged with the slide door arranged in the closed position, such that the guide portion 10C is twisted to generate the restoring force in the same direction as the biasing direction (the arrow R direction) of the twisted coil spring 5, and thereby is fixed in order for this twist to avoid being cancelled.

Next, with reference to FIGS. 3 and 5 a method of assembling the power supply device 1 will be described.

Firstly, a plurality of electrical wires is corrected to constitute an electrical wire 10. Each electrical wire constituting the electrical wire 10 is collected in a nature state without being twisted. The plurality of electrical wires constituting the electrical wire 10 is each set with various colors according to an application or an object of use. Herein, FIG. 5 illustrates the electrical wire 10 composed of the plurality of electrical wires, collectively as a single one in order to simply explain. Furthermore, in FIG. 5 the reference numeral 12 denotes a virtual line for designating a twisted state of the electrical wire 10, and may virtually express a single one among the plural for example. Note that in the present embodiment the electrical wire 10 is illustratively shown to be described as the one in which the plurality of electrical wires is collected and configured, but may be bound and used using a known binding band or an adhesive tape with the plurality of electrical wires collected. At that time, the electrical wire 10 may be bound such as to restrict a move of each electrical wire, or may be bound such as to allow for a motion of each electrical wire.

Next, the inner annular part 44 of the support member 4 is passed outside the twisted coil spring 5. Then while the covering part 60 of the electrical guide part 6 is put close to the support member 4, the one end 5a of the twisted coil spring 5 is provisionally retained by the spring retaining part of the covering part 60, the electrical wire guide part 6 is, in this state, rotated in a direction generating the biasing force in the twisted coil spring 5, and the extension part 66 is fixed to the support member 4 in a state such as to extend straightly toward the opening direction. Thus the twisted coil spring 5 is, with the restoring force (biasing force) in the arrow R direction being kept, arranged within the housing 42. The support member 4, the twisted coil part 5, and the electrical wire guide part 6 assembled as such are referred to as an "assemble part."

Then, the one end of the electrical wire 10 is connected to the vehicle body side, the guide part 10B of the electrical wire 10 is inserted into the corrugated tube C, the other end of the electrical wire 10 is inserted into the outlet 3b of the upper division part 31 of the rotation member 3, a predetermined position of the electrical wire 10 is pinched with the power division part 30 and the upper division part 31 of the rotation member 3 to be locked with the lock part 32. An end of the corrugated tube C is pinched. Then, the other end of the electrical wire 10 is passed through the bearing hole 4a of the assemble part, is inserted in the electrical wire guide part 6, and is guided in the opening direction side. Then, the cover 65 is attached. After that, the assemble part is put close to the rotation member 3, the insertion part 37A of the rotation member 3 is inserted into the bearing hole 4a of the support member 4, the spring force receiving part 38 is inserted into an end of the rotation guide part 46a in the arrow R direction. Thus, the assemble part is assembled into the rotation part 3.

Figure 5A:
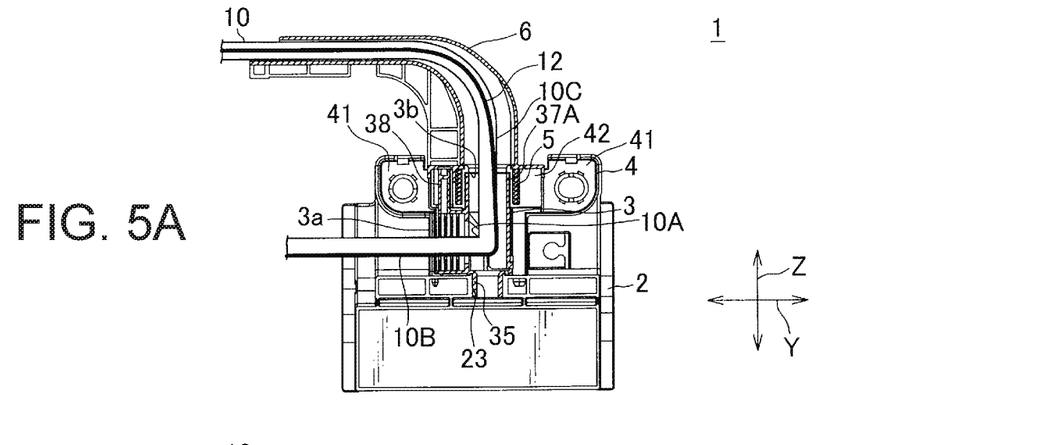
FIG. 5 is a view illustrating a twisted state of the electrical wire wired to the power supply device illustrated in FIG. 1 every opening state and closing state of the slide door.

After that, the guide portion 10C of the electrical wire 10 is twisted such as to generate the restoring force in the same direction as the bias direction of the twisted coil spring 5. Namely, as shown in FIG. 5A, twisted in the clockwise direction viewed from the top (the R direction in FIG. 4), in this state, the band part of the binding band 7 is passed through the fixing portion 69, the guide portion 10C of the electrical wire 10 is fixed to the fixing portion 69. Thus, the electrical wire 10 is fixed while the guide portion 10C is twisted such as to generate the restoring force in the same direction as the twisted coil spring 5.

Finally, the slide door is positioned at the closed position, the assemble part and the rotation member 3 are put close to the surface of the opposite side to the slide door of the base 2, the plate-like part 40 of the support member 4 and the fastening member 41 are stacked on the base plate 20 of the base 2 and the fastening member 21, respectively, and the rotation shaft 35 of the member 3 is inserted into the bearing 23 of the base 2, the base 2 and the support member 4 are bolted to the slide door. Thus, the power supply device 1 is assembled.

Here, the slide door, with the power supply device 1 being assembled, is positioned at the closed position, and the state of being twisted of the guide portion 10C of the electrical wire 10 can be checked. Namely, because the electrical wire 10 is configured to collect each electrical wire of which various colors are set, check of the state of the wire of each electrical wire enables to check that the guide portion 10C of the electrical wire 10 is twisted.

Figure 5B:
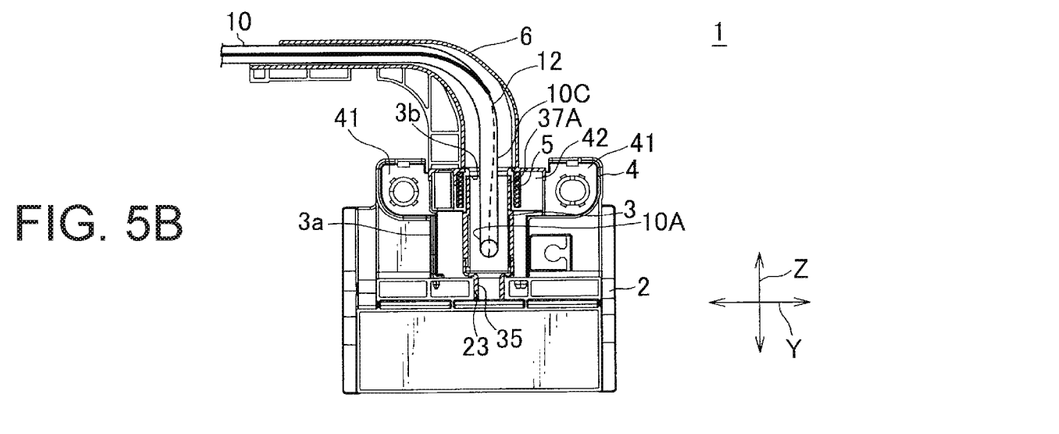
Figure 5C:
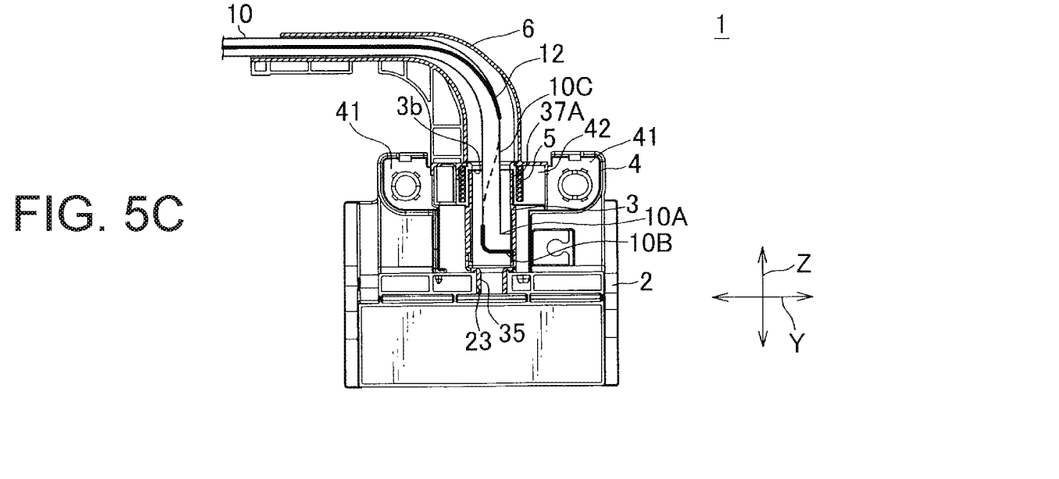

Subsequently, an effect of the power supply device 1 of the present invention will be described with reference to FIGS. 1 and 5. In a state where the slide door is positioned at the closed position, as shown in FIG. 5A, the electrical wire 10 is arranged such that the guide portion 10C is twisted in the clockwise direction (the arrow R direction) when viewed from the top so as to generate the restoring force in the same direction as the biasing force of the twisted coil spring 5 (the arrow R direction). Here, as shown in FIG. 1, when the slide door moves from the half opening position S3 to the opening position S2, the inlet 3a of the rotation member 3 is oriented toward the closed direction against the biasing force of the twisted coil spring 5. At this time, the guide portion 10C of the electrical wire 10, as shown in FIGS. 5B, and 5C, becomes further twisted as the inlet 3a rotationally moves. Therefore, in the state where the inlet 3a of the rotation member 3 is oriented toward the closed direction, the guide portion 10C of the electrical wire 10 is arranged with the greater restoring force is generated in the same direction as the biasing direction of the twisted coil spring 5. That is, in a state where the slide door is disposed at the opening position S2, utilizing both the biasing force of the twisted coil spring 5 and the restoring force of the guide portion 10C of the electrical wire 10, the rotation member 3 is biased so as for the inlet 3a to be oriented toward the opening direction side. The biasing force against the rotation member 3 is thus made possible to grow without enlarging the twisted coil spring 5. Therefore, usage of the twisted coil spring of which biasing force is small makes it possible to provide the power supply device 1 capable of downsizing.

Figure 6A:
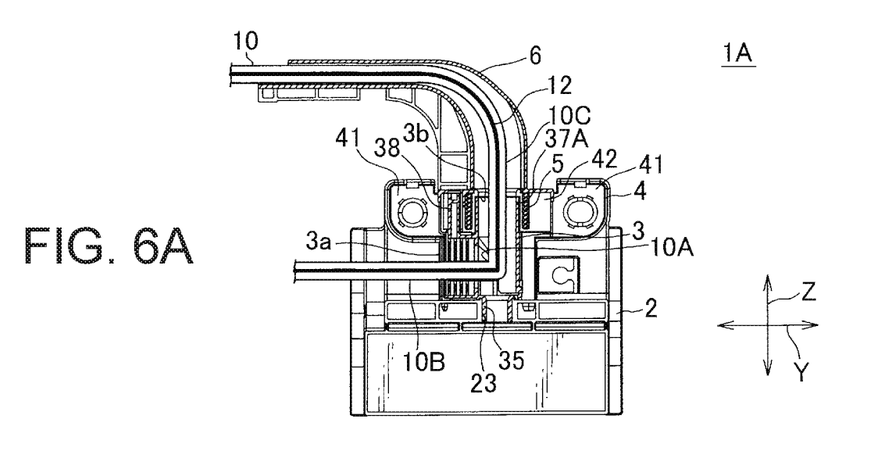
FIG. 6 is a view illustrating a variation example of the power supply device illustrated in FIG. 1, a twisted state of the wired electrical wire every opening state and closing state of the slide door.
Figure 6B:
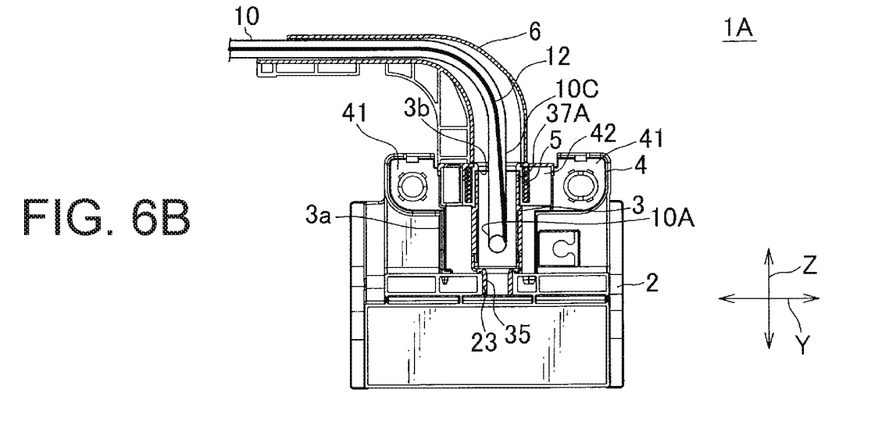
Figure 6C:
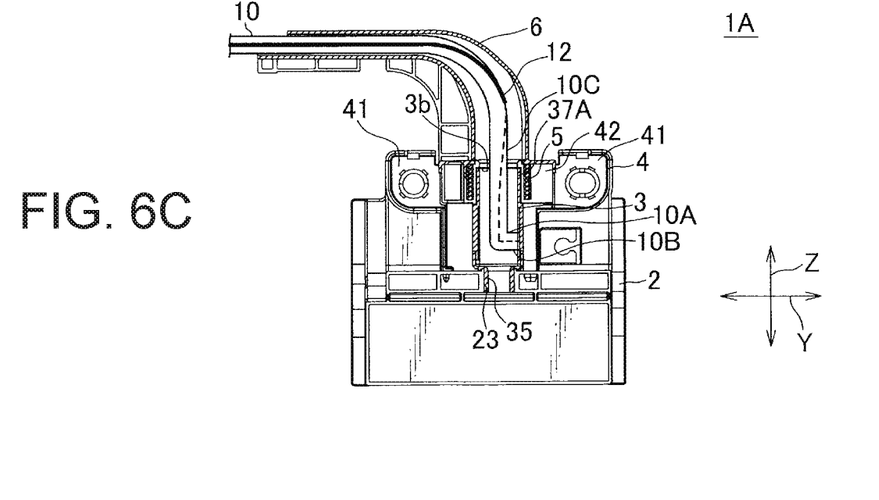

Note that in the aforementioned embodiment in the state where the slide door is disposed at the closed position 51, the guide portion 10C of the electrical wire 10 is made wired so as to generate the restoring force in the same direction as the biasing force of the twisted coil spring 5, but the present invention is not limited thereto. As shown in the power supply device 1A in FIG. 6A, the guide portion 10C of the electrical wire 10 may be wired in the natural state without being twisted while the slide door is arranged at the closed position 51. In this case, as the slide door moves from the closed position S1 to the opening position S2, the electrical wire 10 is, as shown in FIGS. 6B and 6C, twisted such that the guide portion 10C is twisted in the clockwise direction when viewed from the top (the arrow R direction) to generate the restoring force in the same direction as the biasing force (the arrow R direction) of the twisted coil spring 5. It is thereby possible to grow the biasing force against the rotation member 3 without enlarging the twisted coil spring 5. Therefore, since the twisted coil spring biasing force of which is small can be used, it is possible to provide the power supply device 1A capable of downsizing. Note that in FIG. 6 the member designating the same structure and function as mentioned above is omitted denoting the same reference numeral.

Furthermore, in the abovementioned embodiment the twisted coil spring 5 biases the rotation member 3 in the clockwise direction when viewed from the top (the arrow R direction), but the present invention is not limited thereto. The twisted coil spring may bias the rotation member 3 toward the counterclockwise direction when viewed from the top. In this case as the slide door moves from the closed position S1 to the opening position S2, the electrical wire 10 becomes twisted in the counterclockwise direction when viewed from the top such that the guide portion 10C generates the restoring force in the same direction as the twisted coil spring.

Also, in the aforementioned embodiment, the other end of the electrical wire 10 is inserted into the outlet 3b of the upper division part 31 of the rotation member 3, the predetermined of the electrical wire 10 is pinched with the lower division part 30 and the upper division part 31 to assemble the rotation member 3, and the rotation part 3 is then put close to the assemble member, the insertion part 37A of the rotation member 3 is inserted into the bearing hole 4a of the assemble member to assemble, but the present invention is not limited thereto. Inserted into the bearing hole 4a of the assemble member may be the insertion part 37A of the upper division part 31, then the other end of the electrical wire 10 may be inserted into the outlet 3b of the rotation member 3 and the bearing hole 4a of the assemble part, and then the lower division part 30 of the rotation member 3 may be put close to the upper division part 31 to assemble.

Also, in the aforementioned embodiment the fixing portion 69 is arranged at the tip (tip of the electrical wire guide part 6) of the extension part 66, but the present invention is not limited thereto. The fixing part 69 may have the guide portion 10c of the electrical wire 10 fixed to a side separated from the bending portion 10A, or may be arranged nearer the gutter part 64 side (namely a side of the opening direction of the slide door) that is a base side of the extension part 66. In this case a dimension from the bending portion 10A of the electrical wire 10 to a position where the electrical wire 10 is fixed by the fixing portion 69. Therefore, compared with a case where the fixing portion 69 is arranged at the tip of the extension 66, when the guide portion 10C of the electrical wire 10 is twisted by the same angle, the guide portion 10C is twisted to generate greater restoring force, and thus the electrical wire 10, with the slide door is arranged in the opening position, generates further greater restoring force. That is, the position where the fixing portion 10 is formed is determined in accordance with the restoring force required for the electrical wire 10 while the slide door is arranged in the opening position.

Furthermore, in addition to the abovementioned embodiment a discriminator may be provided as a mark to discriminate a twisted state of the guide portion 10C of the electrical wire 10. As the discriminator a mark 12 that is formed on the electrical wire 10 (for example the mark 12 shown in FIG. 5 is formed along the whole length of the electrical wire 10), a first corresponding mark (not shown) formed on the rotation member 3 and a second mark (not shown) formed on the electrical wire guide part 6 may be preliminarily formed. The mark 12 is formed on its circumferential face straightly along the axial direction in the natural state where the electrical wire 10 is not twisted. This mark 12 is formed by coloring differently from the circumferential face of the electrical wire 10. The first corresponding mark is also formed extending along the insertion direction (the arrow Y direction) of the outlet 3b in the lower side of the lower guide wall 33. The second corresponding mark is arranged in the end of the cover 65 in the opening direction. This second mark is formed extending along the vehicle traveling direction (the arrow Y direction) in the middle of the circumferential face of the cover 65 in the vertical direction (the arrow Z direction). Furthermore, near the second corresponding mark is formed an arrow (not shown) colored showing a direction (the arrow R direction) of twisting the electrical wire 10.

Furthermore, the abovementioned embodiments nothing but show typical configurations, and the present invention is not limited to the embodiments. Namely the present invention can be implemented in various deformations within a scope without departing from the gist of the present invention.

BRIEF DESCRIPTION OF DRAWINGS 1 power supply device
3 rotation member (rotation retainer)
3a inlet
3b outlet
5 twisted coil spring (biasing member)

The invention claimed is:

1. A power supply device supplying power by wiring an electrical wire, to a slide door slidable between a closed position where an opening of a vehicle is fully closed and an opening position where the opening of the vehicle is fully opened, the power supply device comprising:
   a rotation retainer including an inlet horizontally guiding the electrical wire an end of which is connected to the vehicle, and an outlet configured to communicate with the inlet and to draw out upwardly an another end of the electrical wire, the rotation retainer being arranged horizontally pivotally at the slide door so as to movably retain the electrical wire; and
   a biasing member configured to bias the rotation retainer in a predetermined rotational direction, wherein
the electrical wire includes a bending portion where the electrical wire is bent in an L-shape between the inlet and the outlet, and a guide portion located nearer the outlet than the bending portion, and wherein
in a condition in which the slide door is arranged in the closed position, the guide portion is arranged in a natural state in which the guide portion is not twisted, or a twisted state in which restoring force is generated in a same direction as a biasing direction of the biasing member.

2. The power supply device according to claim 1 further comprising an electrical wire fixing portion configured to fix the guide portion of the electrical wire at a side separated from the bending portion.

* * * * *